United States Patent [19]

Appl et al.

[11] Patent Number: 4,614,647

[45] Date of Patent: Sep. 30, 1986

[54] STABILIZED SODIUM DITHIONITE FORMULATIONS CONTAINING INERT ORGANIC LIQUIDS, AND THE USE OF THESE FORMULATIONS

[75] Inventors: Max Appl, Dannstadt-Schauernheim; Gerhard D. Molin; Wilhelm Goesele, both of Wachenheim; Siegfried Schreiner, Ludwigshafen; Gert Treiber, Worms, all of Fed. Rep. of Germany

[73] Assignee: BASF Aktiengesellschaft, Ludwigshafen, Fed. Rep. of Germany

[21] Appl. No.: 660,390

[22] Filed: Oct. 12, 1984

[51] Int. Cl.[4] .................. C01B 17/66; B01D 19/00; C09K 3/00
[52] U.S. Cl. .................................. 423/515; 423/265; 252/188.22; 252/188.23
[58] Field of Search ............................. 423/515, 265; 252/188.22, 188.23

[56] References Cited

U.S. PATENT DOCUMENTS

| | | | |
|---|---|---|---|
| 1,810,663 | 6/1931 | Kritchevsky et al. | 252/188.23 |
| 3,353,909 | 11/1967 | Janson | 423/515 |
| 3,839,217 | 10/1974 | Owen et al. | 252/188.23 |
| 3,839,218 | 10/1974 | Owen et al. | 252/188.23 |
| 4,059,533 | 11/1977 | Watson et al. | 252/188.23 |
| 4,177,247 | 12/1979 | Yonemitsu et al. | 423/515 |

FOREIGN PATENT DOCUMENTS

| | | |
|---|---|---|
| 1226992 | 12/1962 | Fed. Rep. of Germany . |
| 1220399 | 7/1966 | Fed. Rep. of Germany . |
| 695375 | 8/1953 | United Kingdom . |
| 717207 | 10/1954 | United Kingdom ............... 423/515 |

*Primary Examiner*—Gary P. Straub
*Attorney, Agent, or Firm*—Keil & Weinkauf

[57] ABSTRACT

Sodium dithionite formulations containing inert organic liquids have the consistency of a pumpable paste.

4 Claims, No Drawings

STABILIZED SODIUM DITHIONITE FORMULATIONS CONTAINING INERT ORGANIC LIQUIDS, AND THE USE OF THESE FORMULATIONS

The present invention relates to sodium dithionite formulations which contain organic liquids, are stabilized and do not tend to ignite spontaneously, and furthermore are easy to handle and meter when used as reducing agents or bleaches, for example in the bleaching of groundwood.

Sodium dithionite, frequently also referred to as sodium hydrosulfite, is classified as a spontaneously ignitable hazardous material under the regulations governing transportation. It is used in large amounts in the chemical industry, for example for bleaching groundwood in the paper-making industry, and as a reducing agent in the dyeing process in the textile industry.

Although anhydrous sodium dithionite is substantially stable when stored in closed containers, it decomposes very rapidly in the presence of water or moisture. The presence of even a small amount of water, eg. from 3 to 10% by weight, causes the product to warm up and decompose, as a result of hydration. During this decomposition, sulfur is liberated with further heat generation; at above 210° C., the sulfur reacts with the atmospheric oxygen present in the crystalline mass and burns with production of flames. In a fire of this type, substantial amounts of sulfur dioxide are evolved, which causes the transport containers to burst and hence permits further atmospheric oxygen to enter.

To reduce these risks, the more stable compound zinc dithionite has therefore frequently been used; however, fro reasons of environmental protection, the use of this product is constantly declining.

It is known that the tendency of sodium dithionite to decompose and to undergo spontaneous ignition can be reduced by diluting it with inert substances. A large variety of substances have been disclosed as diluents, eg. alkaline salts, such as sodium carbonate, sodium phosphate or sodium polyphosphates, urea or dry powders of readily soluble synthetic polymers (DE-B No. 1 220 399 and DE-B No. 1 226 992).

Furthermore, U.S.-C Pat. No. 1 810 663 describes formulations containing sodium dithionite in which the latter is coated with an essentially water-insoluble substance. Substances of this type which are mentioned are oils, fats and waxes. Moreover, the coating contains an emulsifier whose purpose is to emulsify the coating substance on dissolution in water.

The coating compositions mentioned in GB-C No. 695 375 are liquid esters to low volatility which are derived from alcohols of more than 5 carbon atoms. These esters should be used only in amounts such that there is no substantial adverse effect on the free-flowing properties of the dithionite.

Apart from the fact that these powder products are difficult to handle, none of the commercially available stabilized solid sodium dithionite formulations completely satisfy the safety requirements of the processing industry. Because the fine and coarse components present in the products have different flow properties, the metering of these products is adversely affected. Furthermore, the fine components make it more difficult to process these products, since they give rise to troublesome dust which has to be suppressed by means of further additives or eliminated by additional apparatuses. This means that powder formulations of this type are more difficult to process.

For these reasons, the method increasingly adopted over the past few years for the production of sodium dithionite has been one in which the user himself prepares aqueous solutions of sodium dithionite by reaction of sodium borohydride, sodium hydroxide solution and sulfur dioxide. However, this method has the disadvantage that the user has to carry out an involved additional step to produce a starting material, quite apart from the fact that boron is present in the wastewater from the manufacturing process and, for reasons of environmental protection, this wastewater cannot be released without removing the boron from it beforehand.

Some of the above disadvantages of the sodium dithionite powder formulations can be overcome by using aqueous sodium dithionite solutions. However, they have the disadvantage that they are only stable for a limited period, ie. about 4 weeks from the time of preparation of the solution, this stability being achieved, however, only if the solution is cooled to below 10° C., kept in the absence of air and rendered alkaline. Hence, such solutions can only be used where the distance between manufacturer and user is relatively short.

It is an object of the present invention to provide a sodium dithionite formulation which on the one hand is stabilized to atmospheric oxygen and water and on the other hand avoids both the problems entailed in handling the sodium dithionite powder formulations and those associated with the handling of the aqueous sodium dithionite formulations.

We have found that this object is achieved for stabilized sodium dithionite formulations containing organic liquids if the formulations have the consistency of a pumpable paste.

The pastes according to the invention have viscosities of from 1 to 1500, preferably from 40 to 200, Pa.s, determined in a Couette rheometer at 20° C. and a shear rate of $10 \text{ s}^{-1}$ (cf. Praktische Rheologie der Kunststoffschmelzen und-Lösungen, M. H. Pahl, VDI Verlag, Book No. ISBN No. 3-18-404097-6). With the aid of special pumps or special metering apparatuses, hydrosulfite-containing pastes of this viscosity can be conveyed and metered without difficulty when they are being used. Suitable organic liquids are virtually all liquids which are inert to sodium dithionite, ie. which, unlike aldehydes or ketones, do not react with sodium dithionite. Particularly useful liquids are alcohols of 1 to 8 carbon atoms and liquid hydrocarbons, ethers and esters. Suitable alcohols are the monohydric alcohols as well as polyhydric alcohols, such as glycerol or, in particular, glycol. It is of course also possible to use mixtures of alcohols, eg. oxo oil, which consists of a mixture of aliphatic alcohols and is obtained as a by-product in the oxo synthesis during the preparation of $C_9$-$C_{10}$-alcohols.

Liquid hydrocarbons may also be used. In addition to the pure hydrocarbons, it is of course also possible to use hydrocarbon mixtures as obtained in refineries, for example light fuel oil or motor gasoline.

Solvents which are preferably used in the preparation of the novel pastes are those which have a relatively high boiling point or boiling range, ie. above 80° C.; this reduces the risk of fire due to high inflammability.

In the preparation of the novel pastes, the powdered sodium dithionite is processed with the particular organic liquid in an intensive mixer to give a paste having the desired viscosity. The viscosity of the paste depends not only on the viscosity of the organic liquid chosen, but also on the particle size distribution of the sodium dithionite used. One of the factors governing this particle size distribution is the process by which the sodium dithionite is manufactured. For example, a sodium dithionite prepared by the amalgam process has a mean particle size of 160 μm, whereas a sodium dithionite produced by the formate process has a mean particle size of 95 μm. In order to obtain pastes having the same viscosities when equal amounts of sodium dithionite are used, a larger amount of a special organic inert liquid has to be used in the case of the latter form, which has a smaller mean particle size, than in the case of the dithionite produced by the amalgam process, which has on average coarser particles. As the examples below illustrate, the amount of inert organic liquid required in each case can vary considerably, depending on the sodium dithionite used.

After storage for a certain time, or as a result of shaking during transportation, the novel pastes may exhibit partial separation, which manifests itself in the separation of a small amount of the liquid component. However, the thin layer of liquid floating on the paste can be reincorporated mechanically into the paste without difficulty.

To prevent this separation effect, it is, however, simpler to add a smaller amount, eg. not more than about 2% by weight, of a dispersant or thickener to the paste.

The preparation of the pastes entails thickening of the product, the pastes reaching a specific gravity of 1.9 kg/l or higher. It is this effect in particular which is responsible for the fact that the novel pastes exhibit remarkable stability to the action of water. In the presence of small amounts of water, which in powder products results in rapid decomposition and spontaneous ignition, the water forms a layer on top of the paste. Mixing of the two phases cannot take place without substantial mechanical effort, and dangerous decomposition phenomena associated with the sodium dithionite present in the paste were not observed even on heating to, for example, 80° C.

Even the stability of the novel pastes to atmospheric oxygen is substantially greater than that of the conventional powder formulations. This is attributable to the virtually complete exclusion of atmospheric oxygen, which is due on the one hand to the low solubility of the oxygen in the organic component, and on the other hand to the suppression of convection currents in the paste itself.

The advantageous processing properties of the pastes owing to the fact that they are easy to transport and to meter have been pointed out above.

The novel pastes are useful reducing agents and can be employed wherever powder formulations containing sodium hydrosulfite are used, for example in the bleaching of groundwood, and as a reducing agent, eg. in vat dyeing.

EXAMPLES

In all experiments, 20 kg of pulverulent sodium hydrosulfite were homogenized in an intensive mixer with various liquids and additives to give a paste, and the latter was also thickened. The appropriate components and their amounts in percentages by weight are listed in Table 1 below.

The pastes listed under (A) in the table were prepared using a sodium dithionite which was obtained by the amalgam process and had a mean particle size of 160 μm, whereas the pastes listed under (B) were prepared using a dithionite which was obtained by the formate process and had a mean particle size of 95 μm.

TABLE 1

| No. | Hydrosulfite, % by weight | Liquid component(s) | % by weight | Dispersant+ | % by weight | Viscosity of the paste (Pa · s) |
|---|---|---|---|---|---|---|
| Section A, hydrosulfite obtained by the amalgam process ||||||| 
| 1 | 83 | glycol | 17 | — | | about 5 |
| 2 | 87 | glycol | 13 | — | | about 50 |
| 3 | 89 | glycol | 11 | — | | about 1000 |
| 4 | " | glycol | 10.5 | 1 | 0.5 | about 1000 |
| 5 | " | glycol | 10.5 | 2 | 0.5 | about 1000 |
| 6 | " | glycol | 10.5 | 3 | 0.5 | about 60 |
| 7 | " | glycol | 10.5 | 4 | 0.5 | about 60 |
| 8 | " | glycol | 10.5 | 5 | 0.5 | about 800 |
| 9 | 85 | glycol | 10.5 | 6 | 0.5 | about 1000 |
| 10 | 89 | glycol | 10.5 | 7 | 0.5 | about 800 |
| 11 | 90 | glycol | 10.5 | 8 | 0.5 | about 60 |
| 12 | 87 | propanediol | 13 | — | | about 60 |
| 13 | " | diethylene glycol | 13 | — | | about 60 |
| 14 | " | triethylene glycol | 13 | — | | about 60 |
| 15 | " | butane-1,4-diol | 13 | — | | about 60 |
| 16 | 89 | methanol | 11 | — | | about 60 |
| 17 | " | ethanol | 11 | — | | about 60 |
| 18 | 90 | ethanol/water azeotrope | 10 | — | | about 80 |
| 19 | 89 | ethanol | 10.5 | 3 | 0.5 | about 200 |
| 20 | " | ethanol | 10.5 | 5 | 0.5 | about 500 |
| 21 | " | propan-1-ol | 11 | — | | about 60 |
| 22 | " | butan-1-ol | 12 | — | | about 60 |
| 23 | " | butan-1-ol | 10.5 | 3 | 0.5 | about 60 |
| 24 | " | butan-1-ol | 10.5 | 1 | 0.5 | about 60 |
| 25 | 90 | butan-1-ol | 10 | 8 | 1 | about 60 |
| 26 | 89 | pentan-1-ol | 11 | — | | about 60 |
| 27 | " | hexan-1-ol | 11 | — | | about 60 |
| 28 | " | hexan-1-ol | 11 | — | | about 60 |
| 29 | " | oxo oil 910 | 11 | — | | about 60 |
| 30 | " | oxo oil 910 | 10.5 | 3 | 0.5 | about 200 |
| 31 | 90 | oxo oil 910 | 9 | 8 | 1 | about 60 |
| 32 | 85 | light fuel oil | 15 | — | | about 60 |

TABLE 1-continued

| No. | Hydro-sulfite, % by weight | Liquid component(s) | % by weight | Dispersant+ | % by weight | Viscosity of the paste (Pa · s) |
|---|---|---|---|---|---|---|
| 33 | " | light fuel oil | 14.5 | 7 | 0.5 | about 60 |
| 34 | 88 | light fuel oil | 11 | 8 | 1 | about 60 |
| 35 | 85 | paraffin oil, b.p. 180–200° C. | 15 | — | | about 60 |
| 36 | 88 | paraffin oil, b.p. 180–200° C. | 11 | 8 | 1 | about 60 |
| 37 | 85 | ethylene glycol monoethyl ether | 15 | — | | about 60 |
| 38 | " | ethylene glycol monomethyl ether | 15 | — | | about 60 |
| 39 | " | diethylene glycol | 15 | — | | about 60 |
| 40 | " | triethylene glycol | 15 | — | | about 60 |
| 41 | " | triethylene glycol monobutyl ether | 15 | — | | about 60 |
| 42 | 83 | n-butyl acetate | 17 | — | | about 60 |
| 43 | " | isobutyl acetate | 17 | — | | about 60 |
| 44 | 81 | ethylglycol acetate | 19 | — | | about 60 |
| 45 | " | butylglycol acetate | 19 | — | | about 60 |
| Section B, hydrosulfite obtained by the formate process ||||||||
| 1 | 79 | glycol | 21 | — | | about 60 |
| 2 | 82 | glycol | 20 | 8 | | about 60 |
| 3 | 81 | ethanol | 19 | — | | about 80 |
| 4 | " | butan-1-ol | 19 | — | | about 80 |
| 5 | " | oxo oil 910 | 19 | — | | about 60 |
| 6 | 77 | light fuel oil | 23 | — | | about 60 |

+ see Table 2

TABLE 2

| No. | Dispersant |
|---|---|
| 1 | polyethylene oxide, MW 600 |
| 2 | polyethylene oxide/polypropylene oxide copolymer, MW 1000 |
| 3 | $C_{18}$-alcohol $C_{25}$-oxyethylate |
| 4 | dioctyl sodium sulfosuccinate |
| 5 | polyacrylic acid, MW 50,000 |
| 6 | Na salt of polyacrylic acid, MW 50,000 |
| 7 | maleic anhydride/diisobutylene copolymer, MW 12,000 |
| 8 | adduct of 7 moles of ethylene oxide and 1 mole of a $C_{12}$–$C_{14}$-alcohol cut |

We claim:

1. A stabilized sodium dithionite formulation containing inert organic liquids wherein the formulations has the consistency of a pumpable paste, said formulation consisting essentially of 77 to 90% by weight sodium dithionite and inert organic liquids and said organic liquids being selected from alcohols, esters, ethers and/or hydrocarbons.

2. A stabilized sodium dithionite formulation according to claim 1 which contains up to about 2% by weight of a dispersant or thickener.

3. A stabilized sodium dithionite formulation according to claim 2 which contains between 0.5 and 1.0% by weight of a dispersant or thickener.

4. A sodium dithionite formulation according to claim 1, which has a viscosity of from 1 to 1500 Pa.s.

* * * * *

UNITED STATES PATENT AND TRADEMARK OFFICE
CERTIFICATE OF CORRECTION

PATENT NO. : 4,614,647

DATED : September 30, 1986

INVENTOR(S) : Appl et al.

It is certified that error appears in the above-identified patent and that said Letters Patent is hereby corrected as shown below:

On the front page:

Add: [30] Foreign Application Priority Data

October 14, 1983 [DE] Fed. Rep. of Germany...3337388

Signed and Sealed this
Second Day of December, 1986

Attest:

DONALD J. QUIGG

*Attesting Officer*          *Commissioner of Patents and Trademarks*